2,793,227

REMOVAL OF CYANIDE IMPURITIES FROM ACRYLONITRILE

Alexander Sadle, Petersburg, Va., assignor to Allied Chemical & Dye Corporation, New York, N. Y., a corporation of New York No Drawing. Application July 14, 1955,
Serial No. 522,175

5 Claims. (Cl. 260—465.9)

This invention relates to the removal of cyanide impurities from acrylonitrile; more particularly, it relates to the removal of such impurities as hydrogen cyanide and lactonitrile.

Crude acrylonitrile, as obtained by the reaction of acetylene and hydrogen cyanide in the presence of a copper chloride catalyst, normally contains hydrogen cyanide and lactonitrile as two of the principal contaminants along with small quantities of numerous other by-products, such as divinylacetylene, cyano-butadiene, etc. Numerous methods have been suggested for removing the hydrogen cyanide, as well as other contaminants, from the acrylonitrile. Probably, one of the most successful of the prior art processes involves the use of caustic materials, which treatment may be followed by distillation for complete removal of the HCN; in fact, one process which has been described in the prior art is said to be useful in reducing the hydrogen cyanide content to about one part per million. At first blush, this might appear to be a complete solution to the problem; however if lactonitrile is present, this treatment will not completely remove it, and upon subsequent storage of the purified product more hydrogen cyanide will be liberated. This will readily become apparent when one realizes that appreciable amounts of acetaldehyde are formed when acrylonitrile is prepared by the condensation of acetylene and hydrogen cyanide. This acetaldehyde reacts with some of the hydrogen cyanide present according to the following equation:

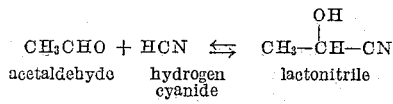

As is indicated, this is a reversible process and it is the mobility of this equilibrium that complicates the complete removal of cyanide from acrylonitrile which has been made by the acetylene process. Normally, if the hydrogen cyanide is to be removed by scrubbing with dilute caustic, the lactonitrile present disassociates during subsequent distillation or on prolonged storage to liberate more hydrogen cyanide. When an excess of caustic is used to decompose the lactonitrile and remove the liberated cyanide, excessive losses of acrylonitrile occur. If purification by distillation is attempted the low boiling acetaldehyde and hydrogen cyanide originally present distill first but the high boiling lactonitrile remains and later disassociates to liberate hydrogen cyanide and acetaldehyde. These contaminants then distill with the acrylonitrile fraction and react in the distillate to establish the lactonitrile-acetaldehyde-hydrogen cyanide equilibrium.

It is accordingly an object of this invention to provide a method of removing both the hydrogen cyanide and the lactonitrile in order to avoid contamination of the final product either by distillation or storage.

It is a further object of this invention to provide means for preventing and minimizing the disassociation of the lactonitrile during processing of the crude acrylonitrile.

It is another object of this invention to provide means for purifying the acrylonitrile and removing therefrom harmful concentrations of cyanide impurities (five parts per million).

It has been found that these objects and other advantages incidental thereto can be attained by the use of successive operations in which the acrylonitrile is first brought into intimate contact with caustic and the treated product is then subjected to a flash distillation step whereby the lactonitrile is removed while exposing the crude acrylonitrile to an elevated temperature for a matter of seconds only. The so-treated product can then be fractionally distilled for complete removal of the HCN.

The process of this invention can be used in purifying crude acrylonitrile which has been obtained by the reaction of acetylene and hydrogen cyanide in the presence of a Leverkusen catalyst (41.2% CuCl, 22.1% NH$_4$Cl, 0.4% HCl, 36.3% H$_2$O) and containing 85–95% acrylonitrile, 4–6% water, about 5000 parts per million cyanide as HCN and lactonitrile plus small quantities of numerous other by-products such as divinylacetylene, cyanobutadiene, etc. In carrying out the process, the crude material is preferably scrubbed in a water-cooled tower or other suitable apparatus with a caustic solution such as a 2% sodium hydroxide solution or a comparable base solution of another alkali or alkaline earth metal. A ratio of about 1 volume of caustic solution for every 10 volumes of crude acrylonitrile is normally adequate for carrying out this step in the process. The caustic solution, should, however, be kept at 30° C. or lower in order to prevent excessive polymerization of the acrylonitrile. If the temperature of the scrubber liquor is allowed to rise above 30° C. violent reaction sometimes occurs. After the crude material has been subjected to the caustic wash, it may be washed in a similar manner with a weakly acid solution such as water saturated with carbon dioxide. In doing this, a ratio of 1 volume of wash liquor to 40 volumes of acrylonitrile is adequate. This acid wash neutralizes the acrylonitrile and tends to prevent undue losses during subsequent purification steps.

The treated material is then subjected to the second step of the process and flash distilled at a pressure of about 5/10 of an atmosphere, taking 80–95% of the feed overhead. A steam-heated long tube evaporator has been found to be satisfactory for this distillation. The acrylonitrile taken overhead contains less than 200 p. p. m. cyanide. Distillation of this overhead through a conventional fractionating column results in a product containing less than 5 p. p. m. cyanide. Bottoms from the flasher may be combined with other impure fractions and the acrylonitrile, suitable for recycle to the cyanide removal process, recovered by azeotropic distillation with water.

Typical data obtained during scrubber and flasher operation are given below:

TOTAL CYANIDE IN ACRYLONITRILE, P. P. M.

| Run No. | Crude | After Caustic and Carbonate Scrubbing | After Flash Distillation |
|---|---|---|---|
| 1 | 2,900 | 2,400 | 100 |
| 2 | 15,300 | 10,000 | 100 |
| 3 | 14,000 | 2,400 | 80 |
| 4 | 1,548 | 855 | 70 |

In all cases listed in the table, distillation of the flashed material through a conventional fractionating column resulted in an acrylonitrile product containing less than 5 p. p. m. cyanide.

Example

A vertical column was fitted with a water jacket through which water at about 20° C. was circulated. The column was charged with 400 parts by weight 2% NaOH solution and 3439 parts by weight crude acrylonitrile containing 0.16% cyanide was fed to the bottom of the column through a diffusion tube. The acrylonitrile from the top of this column was passed through a diffuser in the bottom of a column containing 400 parts by weight of $H_2O$ saturated with carbon dioxide. The overflow from the carbon dioxide scrubber was collected and fed to a long tube type flash evaporator which was operated at 0.5 atmosphere pressure. The evaporator consisted of a steam jacketed tube plus necessary condensers and receivers. The feed rate to the evaporator was adjusted so that 80% of the feed was vaporized and collected as distillate. The distillate contained only 70 p. p. m. cyanide. After fractionation through a conventional distilling column, the product contained less than 5 p. p. m. HCN.

The concentration of caustic solution used in scrubbing the crude acrylonitrile may be varied from 1 to 5% with 1.5 to 2.5% being preferred. At the higher concentrations there is more danger of occurrence of undesirable side reactions, while at the lower concentrations cyanide removal efficiency is reduced. The acrylonitrile to caustic solution ratio may be varied over an extremely wide range depending on the quantities of hydrogen cyanide present. In most cases, a ten to one volume ratio has been found to be satisfactory. The temperature of operation may vary between about 0° and 30° C. Above 30° C. violent polymerization reactions sometimes occur. The lower temperature limit is governed by the freezing point of the caustic solution. For convenience a temperature of 25° C. is preferred. The dilute acid wash following the caustic wash neutralizes any alkalinity in the acrylonitrile and thereby prevents any caustic catalyzed polymerizations to take place during any of the subsequent purification steps. Acids such as sulfuric, acetic and carbon dioxide have been used successfully for this purpose.

The flash distillation step may be conducted in any suitable flash distillation apparatus. Although the preferred operating pressure is about 0.5 atmosphere, operation at other pressures such as 1 atmosphere or below is feasible. At lower pressures, it becomes increasingly more difficult to condense the acrylonitrile vapors. At higher pressures there is an increasing danger of more extensive disassociation of lactonitrile, thereby reducing the efficiency of lactonitrile removal. Residence time in the hot zone should be less than 30 seconds and is preferably of the order of five seconds or less. While the wall temperature of the flash distillation apparatus can be successfully operated at temperatures ranging between 90–150° C.; the preferred range lies between 90–120° C. During the operation the percent of feed vaporized may vary from 60–95%, the preferred range being 75–90%.

The use of both the wash and flash steps were found to be essential if complete removal of the lactonitrile as well as HCN is desired. Attempts at extensive caustic washing to remove the cyanide will necessitate the use of large amounts of caustic and result in excessive acrylonitrile losses. For example, in one experiment extensive washing with 10% sodium hydroxide did not reduce the total cyanide to less than 100 p. p. m. A 20% loss in acrylonitrile resulted from the operation. The use of flash distillation without a prior caustic wash, even on a crude containing comparatively low concentrations of cyanide impurities is not satisfactory. Even though considerable reduction in cyanide content may result, final distillation will not result in a product containing less than 5 p. p. m. cyanide. The sequence of wash and flash distillation is also considered to be important. Reversal of the order will result in cyanide removal, but the preferred order is more efficient from two standpoints. During the wash step, some polymerization occurs. These polymers will precipitate in fractionating columns and column boilers; whereas, they are readily removed in the flash evaporator without precipitating. Another important feature of the sequence is that the caustic solution may remove hydrogen cyanide by catalyzing hydrogen cyanide addition and condensation reactions as well as by neutralization. When the flash distillation is used after the caustic wash, the hydrogen cyanide addition and condensation products formed during washing are removed; whereas, if the order were reversed, they would remain with the acrylonitrile and cause trouble in the final distillation.

While the above description discloses a preferred and practical embodiment of the process for purifying acrylonitrile, in accordance with this invention, it will be understood that the specific details set for herein are by way of illustration and are not to be construed as limiting the scope of the invention.

I claim:

1. In the process of purifying acrylonitrile, the steps comprising treating the acrylonitrile with a 1–5% caustic solution, subsequently flash distilling the so-treated product to remove lactonitrile and then fractionally distilling the acrylonitrile to remove remaining cyanide impurities.

2. In the process of purifying acrylonitrile, the steps comprising treating the acrylonitrile with a 1–5% caustic solution at a temperature within the range of 0–30° C., subsequently flash distilling the so-treated product at a pressure below atmospheric to remove lactonitrile and then fractionally distilling the acrylonitrile to remove remaining cyanide impurities.

3. In the process of purifying acrylonitrile, the steps comprising scrubbing the acrylonitrile with a 2% caustic solution at a temperature of about 25° C., subsequently flash distilling the so-treated product at a pressure less than atmospheric to remove lactonitrile and fractionally distilling the acrylonitrile to remove remaining cyanide impurities to obtain a product containing less than 5 p. p. m. of HCN.

4. In the process of purifying acrylonitrile, the steps comprising treating the acrylonitrile with a 1–5% caustic solution at a temperature within the range of 0–30° C., flash distilling the so-treated product at a pressure of about .5 atmosphere and at a temperature such that the acrylonitrile remains in the hot zone for less than thirty seconds, separating the lactonitrile along with the distillation residue, and subsequently fractionally distilling the acrylonitrile to remove the remaining cyanide impurities to obtain a product containing less than 5 p. p. m. of HCN.

5. In the process of purifying acrylonitrile, the steps comprising scrubbing the acrylonitrile with a 1–5% caustic solution at a temperature of about 25° C., neutralizing the so-treated solution, flash distilling the so-treated product at a temperature such that the acrylonitrile remains in the hot zone for about five seconds and at a pressure of about .5 atmosphere to thereby remove the lactonitrile and fractionally distilling the acrylonitrile to remove any remaining cyanide impurities.

References Cited in the file of this patent

UNITED STATES PATENTS 2,653,966     Taylor et al.            Sept. 29, 1953